(12) United States Patent
Prince

(10) Patent No.: US 6,360,203 B1
(45) Date of Patent: Mar. 19, 2002

(54) SYSTEM AND METHOD FOR DYNAMIC VOICE-DISCRIMINATING NOISE FILTERING IN AIRCRAFT

(75) Inventor: Allan Prince, Redmond, WA (US)

(73) Assignee: dB Systems, Inc., Redmond, WA (US)

(*) Notice: Subject to any disclaimer, the term of this patent is extended or adjusted under 35 U.S.C. 154(b) by 0 days.

(21) Appl. No.: 09/375,160

(22) Filed: Aug. 16, 1999

Related U.S. Application Data

(60) Provisional application No. 60/135,610, filed on May 24, 1999.

(51) Int. Cl.[7] .................. G01L 21/02; G01L 19/14; H04M 1/19; H03B 29/00
(52) U.S. Cl. .................. 704/270; 704/226; 704/225; 704/228; 386/71.1; 379/392.01
(58) Field of Search .................. 381/57, 106–108; 704/270, 500

(56) References Cited

U.S. PATENT DOCUMENTS

| | | | |
|---|---|---|---|
| 4,403,348 A | * 9/1983 | Leland et al. | 381/107 |
| 4,674,122 A | * 6/1987 | Orban | 381/106 |
| 4,941,187 A | 7/1990 | Slater | |
| 5,459,814 A | 10/1995 | Gupta et al. | |
| 5,673,325 A | 9/1997 | Andrea et al. | |
| 5,708,722 A | 1/1998 | Forgues et al. | |
| 5,727,072 A | 3/1998 | Raman | |
| 5,774,557 A | 6/1998 | Slater | |
| 5,794,187 A | 8/1998 | Franklin et al. | |
| 5,806,025 A | 9/1998 | Vis et al. | |
| 5,819,217 A | 10/1998 | Raman | |
| 5,825,754 A | 10/1998 | Williams | |
| 5,825,897 A | 10/1998 | Andrea et al. | |
| 5,907,622 A | * 5/1999 | Dougherty | 381/57 |

* cited by examiner

*Primary Examiner*—Richemond Dorvil
*Assistant Examiner*—Daniel Nolan
(74) *Attorney, Agent, or Firm*—Christensen O'Connor Johnson Kindness PLLC

(57) ABSTRACT

A dynamic voice operated filtering system for aircraft applications includes an input limiter, an expander, an output limiter and a user control. The input limiter receives an input signal representing a mixed voice and noise signal and filters the input signal. The input limiter outputs an attenuated version of the input signal ($IN_L$) to the expander. The input limiter attenuates the input signal so that the signal $IN_L$ received by the expander remains within the expander's dynamic range. The expander outputs a signal $IN_X$, which represents an expanded version of signal $IN_L$. The signal $IN_X$ has an amplitude that is a function of the amplitude of signal $IN_L$. The expander is configured to attenuate signal $IN_L$ to serve as signal $IN_X$ when the signal $IN_L$ has a relatively low amplitude and amplifies signal $IN_L$ to serve as the signal $IN_X$ when the signal $IN_L$ has a relatively high amplitude. The output limiter then receives the signal $IN_X$ and, in response, filters the signal $IN_X$. The output limiter outputs an output signal representing an attenuated version the signal $IN_X$. This output signal is provided to one or more standard audio output devices of the aircraft intercom system.

15 Claims, 7 Drawing Sheets

SYSTEM AND METHOD FOR DYNAMIC VOICE-DISCRIMINATING NOISE FILTERING IN AIRCRAFT

RELATED APPLICATIONS

This application claims the benefit of U.S. Provisional Application No. 60/135,610, filed May 24, 1999.

FIELD OF THE INVENTION

The present invention relates in general to the field of speech signal processing, and, more particularly, to a dynamic voice operated filtering system for use in an aircraft voice intercom system and method thereof.

BACKGROUND

On board an aircraft, clear communications are essential for safe operation. For onboard voice communication between aircraft operators, an onboard electronic intercom system is the main communication system used. Typically, for pilots and other cockpit personnel, the onboard electronic intercom system includes headphones and microphones.

In operation, the microphone receives both voice signals and ambient background noise signals. Thus, the user(s) on the receiving end of the electronic intercom system will hear both voice and noise signals. As can be appreciated, the users generally dislike hearing the noise as being annoying. Further, the noise can inhibit clear, intelligible communication, causing miscommunication of information that could be extremely dangerous while the aircraft is in operation. Noise mixed with speech can make speech unintelligible and, further, noise that occurs between words and syllables of the voice signal may render the voice signal unintelligible and can increase operator fatigue.

Some conventional intercom systems try to reduce the effects of noise by using a compander system. Mixed noise and voice signals are compressed at the transmitting end and then expanded at the receiving end of the system. These systems are typically directed to reducing the effect of noise introduced electrically in the transmission channel, between the microphone and the headphone. Thus, acoustic ambient noise picked up by the microphone undesirably tends to pass through unchanged in these systems. Other conventional systems attempt to cancel noise by attempting to measure ambient noise without the voice signal and then subtract the "measured" noise from the combined voice and noise signal. These systems generally require two microphones, the first microphone being used to pick up the combined voice and noise signal while the second microphone attempts to pick up only the noise. The second microphone adds cost and complexity to the intercom system and may not provide good performance because the noise picked up by the second microphone may not accurately represent the noise picked up in the first microphone. Still other conventional systems use digital signal processing techniques to implement an adaptive noise filter. These systems typically require complex and costly digital signal processors. Accordingly, there is a need for an intercom system for aircraft applications that is low complexity and low-cost while providing good ambient noise suppression during operation.

SUMMARY

In accordance with the present invention, a dynamic voice operated filtering system for aircraft applications is provided. In one aspect of the present invention, the dynamic voice operated filtering system includes an input limiter, an expander, an output limiter and a user control. The input limiter receives an input signal representing a mixed voice and noise signal and filters the input signal. In one embodiment, the input limiter outputs an attenuated version of the input signal ($IN_L$) to the expander, with the attenuation ranging from 0 dB to −50 dB. The input limiter attenuates the input signal so that the signal $IN_L$ received by the expander remains within the expander's dynamic range. The expander outputs a signal $IN_X$, which represents an expanded version of signal $IN_L$. In particular, the expander outputs signal $IN_X$ with amplitude as a function of the amplitude of signal $IN_L$. In one embodiment, this function, in effect, ranges from relatively large amounts of attenuation to relatively moderate amounts of amplification. Thus, for example, the expander in effect attenuates signal $IN_L$ to serve as signal $IN_X$ when the signal $IN_L$ has a relatively low amplitude and amplifies signal $IN_L$ to serve as the signal $IN_X$ when the signal $IN_L$ has a relatively high amplitude. In one embodiment, the amplification and attenuation ranges from +20 dB to −60 dB. The output limiter then receives the signal $IN_X$ and, in response, limits the signal $IN_X$. In one embodiment, the output limiter outputs an output signal representing an amplified version the signal $IN_X$. This output signal would then be provided to one or more standard audio output devices of the aircraft intercom system.

In another aspect of the present invention, the attenuation of the input and output limiters can be adjusted by the user through the user control. This control in effect allows the user to adjust the offset of the combined voice and noise input signal. The user adjusts the limiter settings so that periods of silence (e.g., between spoken words) are relatively greatly attenuated while periods of speech are amplified without distortion. This scheme, in effect, filters out ambient background noise between spoken words so that the combined voice/background noise signals are amplified. As a result, this filtering scheme advantageously reduces irritating background noise between words and syllables, which in turn tends to make the speech transmitted by the aircraft intercom system more intelligible to listeners.

In yet another aspect of the present invention, the user control and the limiters are configured so that an adjustment of the user control that causes an increase (or decrease) of the attenuation in the input limiter causes a corresponding decrease (or increase) increase in the attenuation of the output limiter. In one embodiment, each limiter measures a signal level (e.g., a voltage proportional to rms power) of the signal received by the limiter and compares the signal level to a user-adjustable signal level provided by the user control. The difference between the two signal levels is used to control the attenuation provided by the limiter. In this way, the filtering system is dynamically adjusted by the combined voice and noise input signal to filter out ambient background noise between spoken words and amplify combined voice/background noise signals.

DETAILED DESCRIPTION

Figure 1:
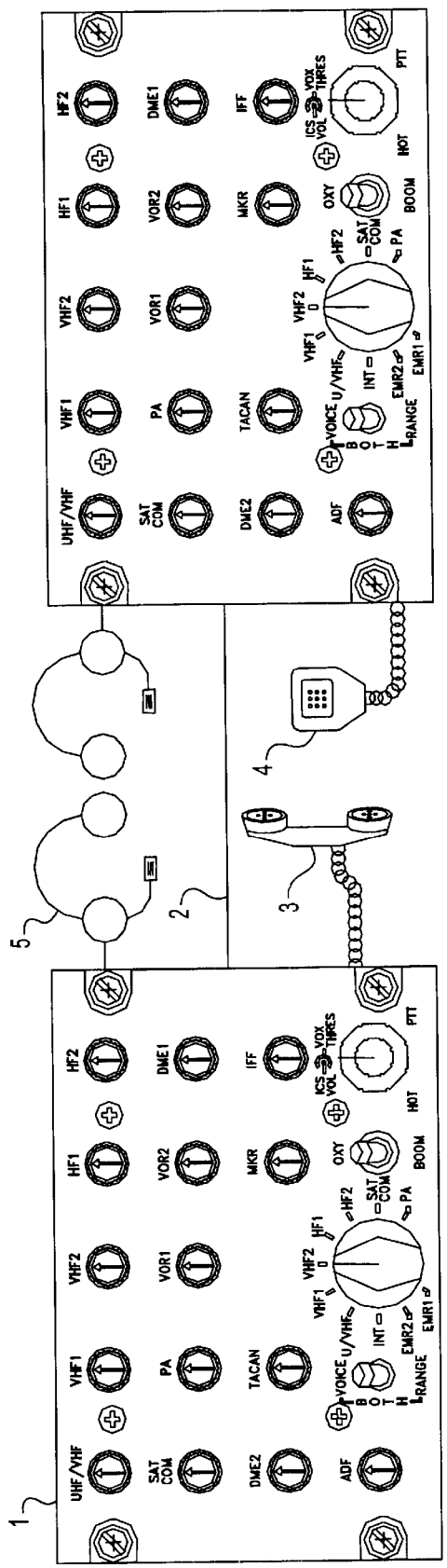
FIG. 1 is a diagram illustrating an aircraft audio control system.

FIG. 1 illustrates an aircraft audio control system 1 located in the cockpit of an aircraft. The pilot or co-pilot can activate an intercom system through the aircraft audio control system 1. For example, the pilot may activate an intercom system that allows the pilot or co-pilot to communicate. The pilot (or co-pilot) can use a telephone handset 3 to communicate with the co-pilot (or pilot) via the intercom. Similarly, the pilot or co-pilot may use a microphone headset 4 to communicate with each other. However, ambient noise may be present in the cockpit (e.g., engine noise, vibrations, audio signals from cockpit equipment, conversations in the cockpit, etc.). These noise signals can picked up by the telephone handset 3 or the microphone headset 4 along with the speaker's voice signals when the intercom system is being used. However, the aircraft audio control system 1 includes a dynamic voice operated filtering system 5 as described below in conjunction with FIG. 2 to reduce the adverse affects of this ambient background noise.

Figure 2:
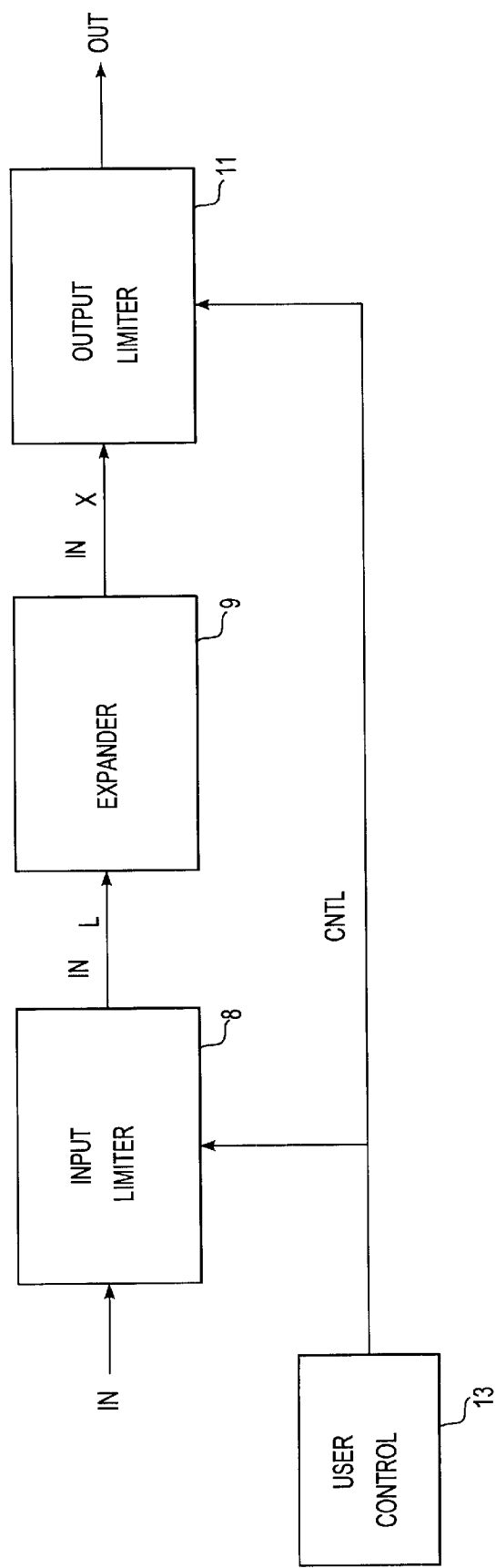
FIG. 2 is a block diagram illustrating a dynamic voice operated filtering system for aircraft applications, according to one embodiment of the present invention.

FIG. 2 illustrates the dynamic voice operated filtering system 5 for aircraft applications, according to one embodiment of the present invention. System 5 includes an input limiter 8, an expander 9, an output limiter 11 and a user control 13. System 5 is interconnected as follows. The input limiter 8 is connected to receive an input signal representing a combined voice and ambient background noise signal. Such a signal can be generated by the standard telephone handset 3 (FIG. 1) or the microphone handset 4 (FIG. 1). The expander 9 is connected to receive a signal $IN_L$ from the input limiter 8 and to provide a signal $IN_X$ to the output limiter 11. The user control 13 is connected to provide a control signal CNTL to input and output limiters 8 and 11. The operation of system 5 is described below in conjunction with FIG. 3.

Figure 3:
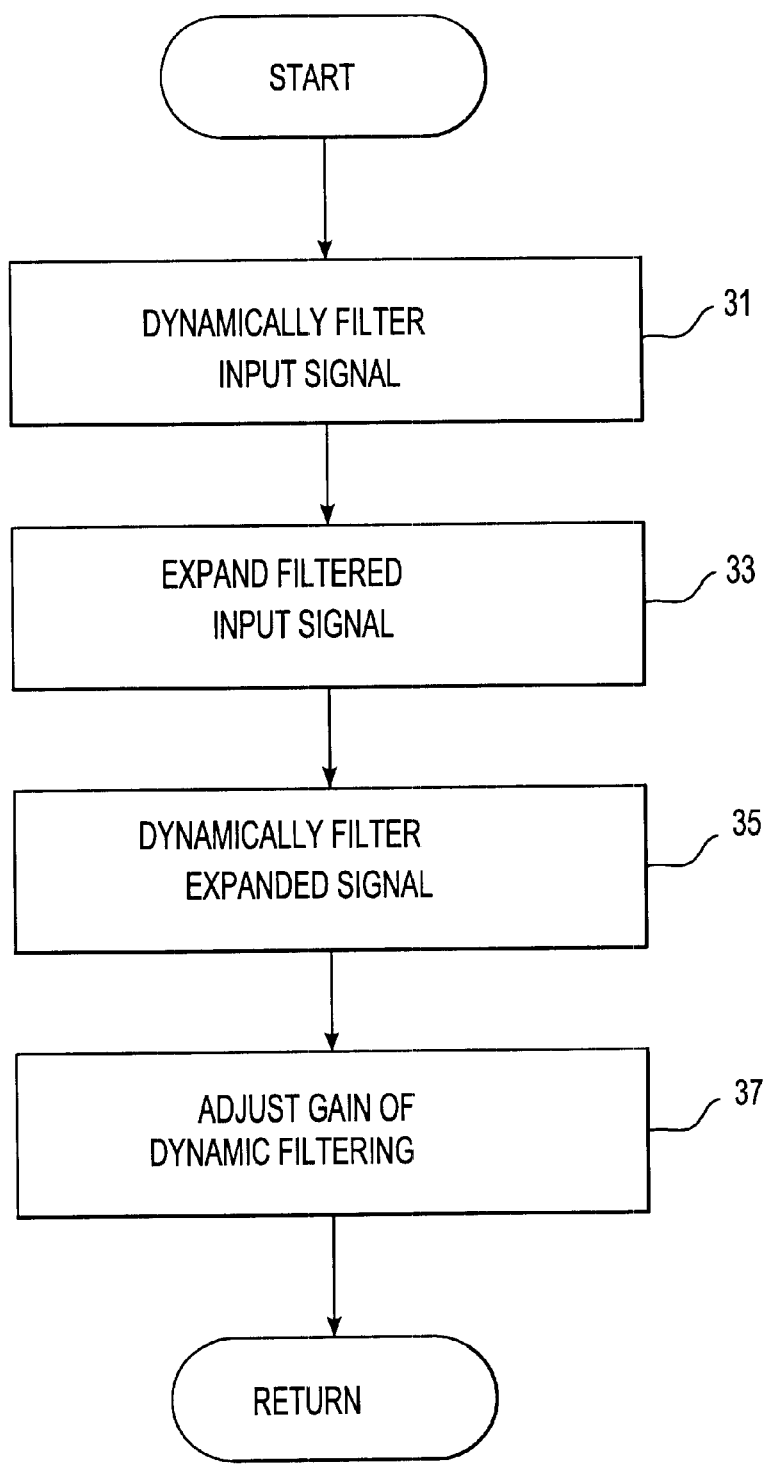
FIG. 3 is a flow diagram illustrating the operation of the dynamic voice operated filtering system of FIG. 2.

FIG. 3 is a flow diagram illustrating the operation of the dynamic voice operated filtering system 5 (FIG. 2). Referring to FIGS. 2 and 3, system 5 operates as follows. In a step 31, the input limiter 8 receives an input signal representing a mixed voice and noise signal. The input limiter 8 is configured to attenuate the input signal so that the signal $IN_L$ received by the expander 9 does not cause the expander 9 to exceed its dynamic range. In one embodiment, the attenuation ranges from about 0 dB to about −50 dB.

In a next step 33, the expander 9 outputs a signal $IN_X$, which represents an expanded version of signal $IN_L$. In particular, the expander 9 outputs the signal $IN_X$ to have an amplitude that is a function of the amplitude of the signal $IN_L$. In one embodiment, this function, in effect, provides gain that ranges from relatively large amounts of attenuation to relatively moderate amounts of amplification. Thus, for example, the expander 9 in effect attenuates signal $IN_L$ to serve as signal $IN_X$ when the signal $IN_L$ has a relatively low amplitude and amplifies signal $IN_L$ to serve as the signal $IN_X$ when the signal $IN_L$ has a relatively high amplitude. In one embodiment, the amplification and attenuation ranges from +20 dB to −60 dB. A response diagram for one embodiment of the expander 9 is described below in conjunction with FIG. 5B.

In a next step 35, the output limiter 11 then receives the signal $IN_X$ and, in response, outputs an output signal representing an attenuated version the signal $IN_X$. In this embodiment, the attenuation provided by the output limiter 11 is designed to compensate for the attenuation provided by the input limiter 8. For example, if the input limiter 8 had highly attenuated the input signal, then the output limiter 11 would provide little or no attenuation. On the other hand, if the input limiter 8 only slightly attenuated the input signal, then output limiter 11 would provide relatively high attenuation. In this way the total attenuation provided by the limiters 8 and 11 remains fairly constant as the user adjusts the limiters through the user control 13, thereby allowing downstream circuitry to be optimized to process the output signal from output limiter 11. For example, the output signal generated by output limiter 11 would then be provided to one or more standard acoustic output devices of the aircraft intercom system.

In a step 37, the user adjusts the gains of the input and output limiters 8 and 11 through the user control 13. Although steps 31–37 are illustrated as sequentially in the given order, in light of this disclosure those skilled in the art will appreciate that while a user is speaking into the intercom system, these steps are occurring essentially simultaneously for different points of the input signal. Thus, the user would be able to adjust the gains of the limiters 8 and 11 "on the fly" while speaking into the intercom system in a feedback-like operation. That is, while speaking, the user can adjust the limiter settings so that for periods of silence (e.g., between spoken words), the input signal is relatively greatly attenuated while during periods of speech the input signal is amplified. The user control 13 advantageously allows the user to adjust system 5 for varying levels of ambient background noise.

Another way to view the operation of adjusting the gains is that the adjustment, in effect, adjusts the offset of the input signal. This adjustment of the offset is used in conjunction with the fixed response of the expander 9 to adjust the amplitude threshold at which the input signal is attenuated. As those skilled in the art will appreciate in light of this disclosure, this threshold is ideally set at the maximum amplitude level of the ambient background noise. This scheme, in effect, filters out ambient background noise between spoken words while amplifying the combined voice/background noise signal. As a result, this filtering scheme advantageously reduces irritating background noise between words, which in turn tends to make the speech transmitted by the aircraft intercom system more intelligible to listeners.

Figures 4, 4A:
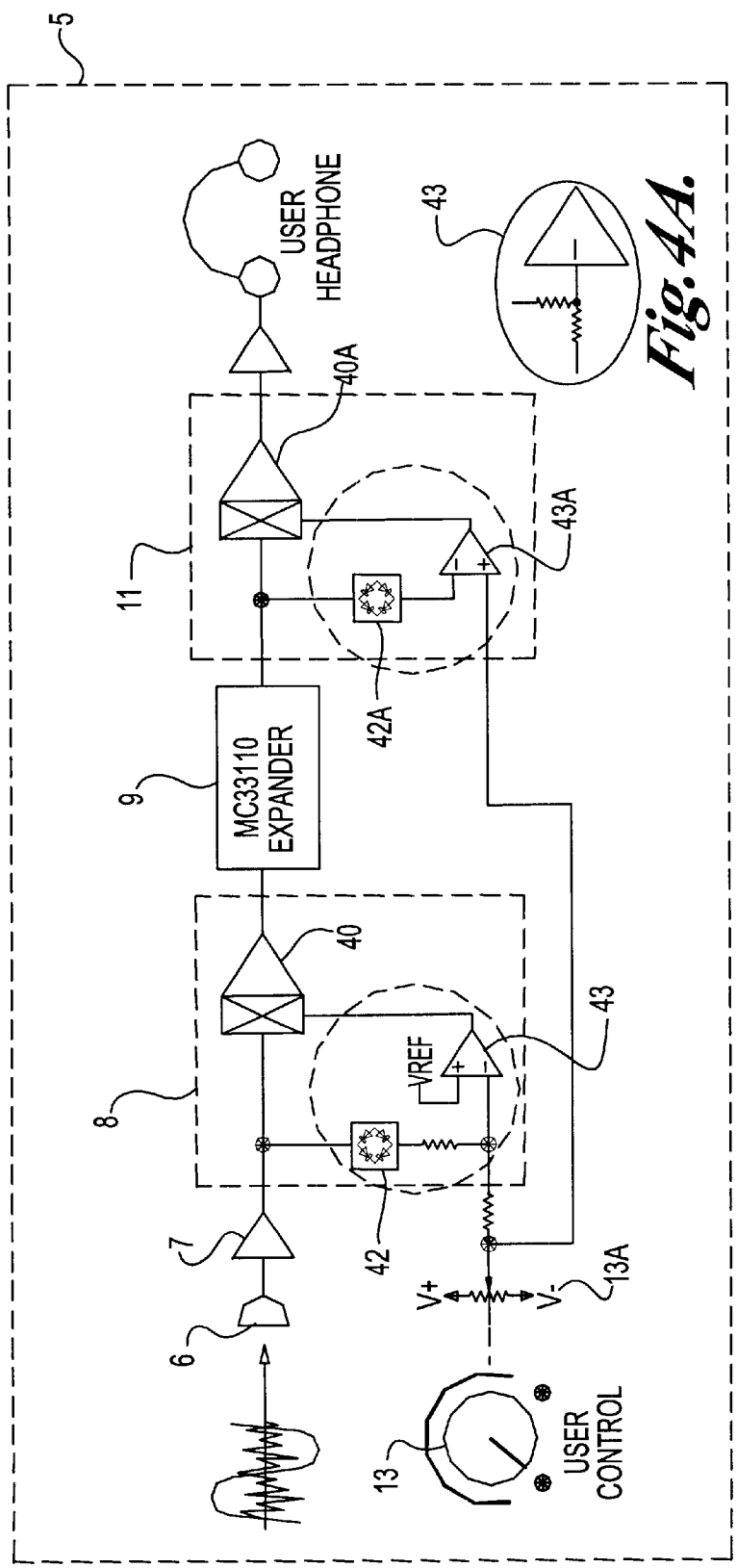
FIG. 4 is a schematic diagram illustrating one embodiment of the dynamic voice operated filtering system of FIG. 2.
FIG. 4A illustrates a simplified representation of the input limiter of FIG. 4.

FIG. 4 illustrates in more detail one implementation of the dynamic voice operated filtering system 5 (FIG. 2). FIG. 4 is substantially the same as FIG. 2 except that FIG. 4 shows how the expander 9, the user control 13, and the input and output limiters 8 and 11 are implemented. In particular, the expander 9 is implemented in this embodiment with a MC33110 analog expander chip available from Motorola. The expander 9 is described in more detail below in conjunction with FIG. 5B. Of course, in other embodiments, other suitable expander chips may be used. Alternatively, an expander circuit may be implemented in an ASIC (i.e., an application specific integrated circuit), which would also have the input and output limiters 8 and 11 implemented thereon. The user control 13 is implemented with a potentiometer 13A connected between two voltage sources. The wiper of the potentiometer 13A is mechanically connected to the user control 13. In addition, the input limiter 8 is implemented with a voltage-controlled amplifier 40, a rectifier circuit 42, and differential amplifier 43. In one embodiment, the voltage-controlled amplifier 40 is implemented with a SSM2164, available from Analog Devices. In this embodiment, the voltage-controlled amplifier is configured to provide relatively constant gain until the control voltage reaches a threshold level. However, once the threshold is exceeded, the voltage-controlled amplifier is configured to severely attenuate the received signal. The rectifier circuit 42 and the differential amplifier 43 are implemented with standard components available from a variety of manufacturers.

The input limiter 8 is interconnected as follows. The voltage-controlled amplifier 40 and rectifier circuit 42 are connected to receive the input signal via a microphone 6 and amplifier 7. The output lead of the voltage-controlled amplifier 40 is connected to an input lead of the expander chip 9. The output lead of the rectifier circuit 42 is connected to a "negative" input lead of the differential amplifier 43. The "negative" input lead of the differential amplifier 43 is also connected to the output lead of the user control 13 (i.e., the wiper of the potentiometer 13A). The positive input lead of the differential amplifier 43 is connected to a reference voltage source (e.g., a ground line). The output lead of the differential amplifier 43 is connected to the control lead of voltage-controlled amplifier 40. FIG. 4A shows another way of describing the differential amplifier 43 using a single negative input terminal and two resistors to form the negative summation amplifier.

The input limiter 8 operates as follows. The rectifier circuit 42 rectifies the combined voice and noise signal from the microphone 6. Thus, the rectifier circuit 42 produces a signal that has a voltage proportional to the rms power of the combined voice and noise signal. This signal is provided to the "negative" input lead of the differential amplifier 43. The user control 13 also provides a voltage signal to the "negative" input lead of the differential amplifier 43. This configuration provides a scaled negative summation of the signals to the voltage-controlled amplifier 40. In response to this control signal outputted by the differential amplifier 43, the voltage-controlled amplifier 40 adjusts its gain. As a result, the input limiter 8 actively controls the signal strength of the combined voice and noise signal provided to the expander 9. In this way, the expander 9 is prevented from exceeding its dynamic range.

As previously mentioned, the user can adjust the voltage signal from the user control 13. In this way, the user can adjust the input limiter 8 so that the output signal of the input limiter 8 is optimally offset so that expander 9 attenuates ambient background noise. The response of the input limiter 8 to the user control 13 is described in more detail below in conjunction with FIG. 5.

The output limiter 11 is essentially identical in implementation as the input limiter 8, having a voltage-controlled amplifier 40A, a rectifier circuit 42A, and amplifier 43A. However, the user control signal is provided to the "positive" input lead of the differential amplifier 43A. The output signal of the rectifier circuit 42A is provided to the "negative" input lead of the differential amplifier 43A. This configuration responds to an adjustment of the user control 13 so that an adjustment that causes an increase (or decrease) of the gain in the input limiter 8 will cause a corresponding decrease (or increase) in the gain of the output limiter 11. The response of the output limiter 11 is described in more detail below in conjunction with FIG. 5C.

Figure 5A:
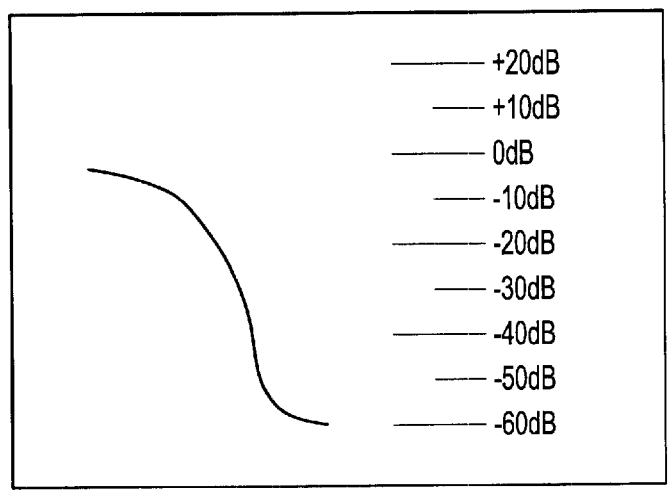
FIGS. 5A–5C are diagrams illustrating the responses of the expander and limiters of the system of FIG. 4, respectively.

FIG. 5A illustrates the response of the input limiter 8 in conjunction with the user control 13, according to one embodiment of the present invention. In particular, FIG. 5A represents the nominal gain provided by the input limiter 8 as a function of the level of the voltage signal provided by the user control 13. As can been seen in FIG. 5A, this embodiment provides at one extreme level of the voltage signal provided by the user control 13, the input limiter 8 provides a gain of about 0 dB. Conversely, at the other extreme level of the voltage signal provided by the user control 13, the input limiter 8 provides a gain of about −50 dB. In this embodiment, the response curve is piece-wise logarithmic. However, as described above, the gain provided by the input limiter 8 is also limited through the control mechanism implemented by the rectifier circuit 42 and the differential amplifier 43.

Figure 5B:
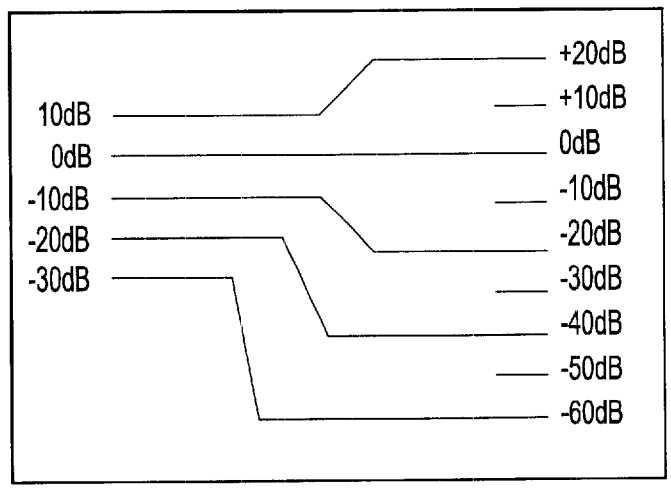

FIG. 5B illustrates the response of the expander 9, according to one embodiment of the present invention. The expander 9 provides a gain as a function of the amplitude of the signal received at its input lead. In this embodiment, the expander 9 upward or downward expands (in a log scale) the amplitude of the signal received at its input lead. For example, when the signal has a amplitude of about 10 dB, the expander 9 outputs a signal having an amplitude of about 20 dB. However, when the signal has an amplitude of about −30 dB, the expander 9 outputs a signal having an amplitude of about −60 dB. Thus, relatively low amplitude signals (such as expected for ambient background noise) will be further attenuated, while relatively high amplitude signal (such as expected for combined voice and noise signals) will be amplified.

Figure 5C:
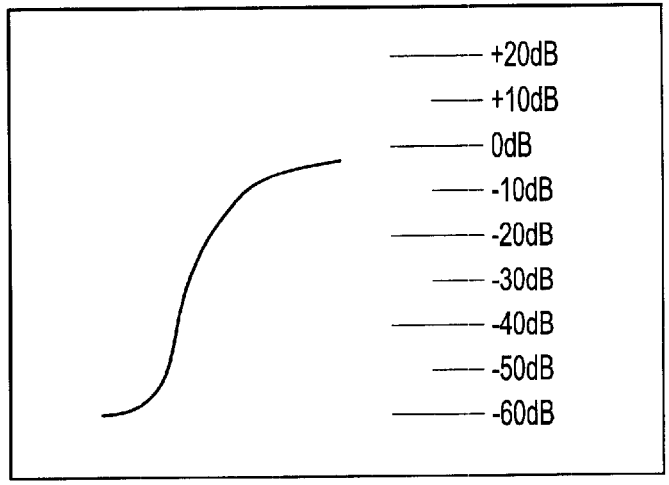

FIG. 5C illustrates the response of the output limiter 11 in conjunction with the user control 13, according to one embodiment of the present invention. In particular, FIG. 5C represents the nominal gain provided by the output limiter 11 as a function of the level of the voltage signal provided by the user control 13. As can been seen in FIG. 5C, this embodiment provides at one extreme level of the voltage signal provided by the user control 13, the output limiter 11 provides a gain of about −60 dB. Conversely, at the other extreme level of the voltage signal provided by the user control 13, the output limiter 11 provides a gain of about 0 dB. In this embodiment, the response curve is piece-wise logarithmic and is the approximate mirror image of the response of input limiter 8 (see FIG. 5A). However, as described above, the gain provided by the output limiter 11 is also limited through the control mechanism implemented by the rectifier circuit 42A and the differential amplifier 43A.

Figure 6:
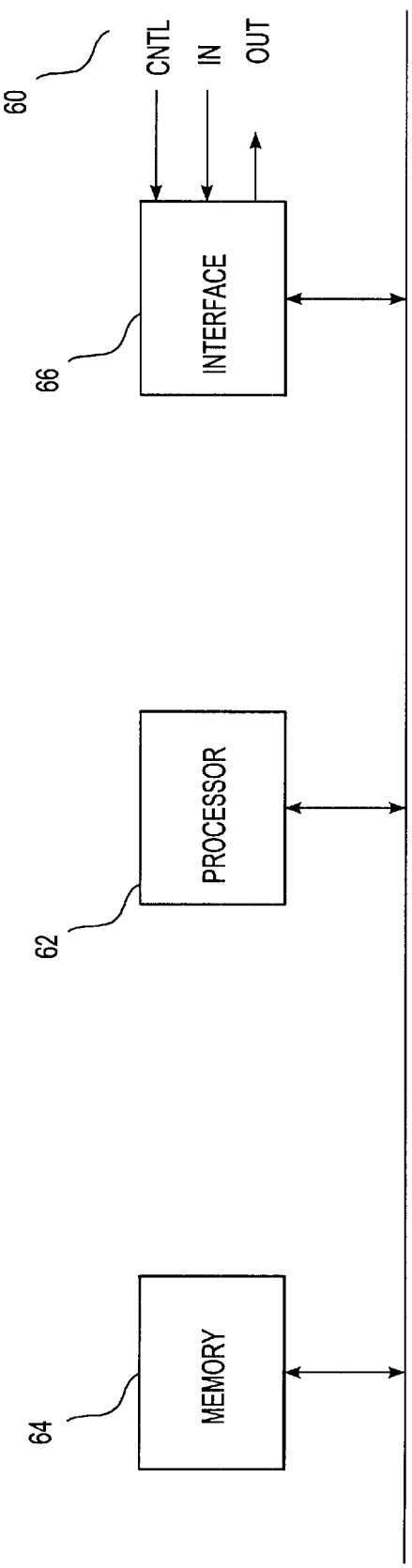
FIG. 6 is a block diagram illustrating a processor-based dynamic voice operated filtering system, according to another embodiment of the present invention.

FIG. 6 illustrates a processor-based dynamic voice operated filtering system 60, according to another embodiment of the present invention. In this embodiment, system 60 includes a processor 62, a memory 64 and an interface 66 for outputting the output signal (FIG. 2) and for receiving and digitizing the signal CNTL and the combined voice and noise input signal (FIG. 2). In one embodiment, the processor 62 is implemented with a digital signal processing (DSP) chip such as a MC56300, available from Motorola. The memory 64 in this embodiment includes RAM for storing data and instructions and non-volatile memory for storing a software program and configuration data to be used by the processor 62 and, optionally, for storing fault data generated from performing tests. In one embodiment, the interface 66 includes an analog-to-digital converter or ADC (not shown) for sampling the signal CNTL and the combined voice and noise input signal (FIG. 2). In addition, the interface 66 typically includes a standard low pass filter (not shown) for filtering out frequencies outside the audio bandwidth of interest. The sampling rate of the ADC (not shown) would be at least twice the upper frequency limit of the low pass filter. Further, the interface 66 would generally include a digital-to-analog converter or DAC (not shown) for converting the digital data generated by the processor 62 into an analog output signal usable by the standard acoustic output devices (not shown) of the intercom system. System 60 is programmed to implement a dynamic voice operated filtering system as described below in conjunction with FIG. 7.

Figure 7:
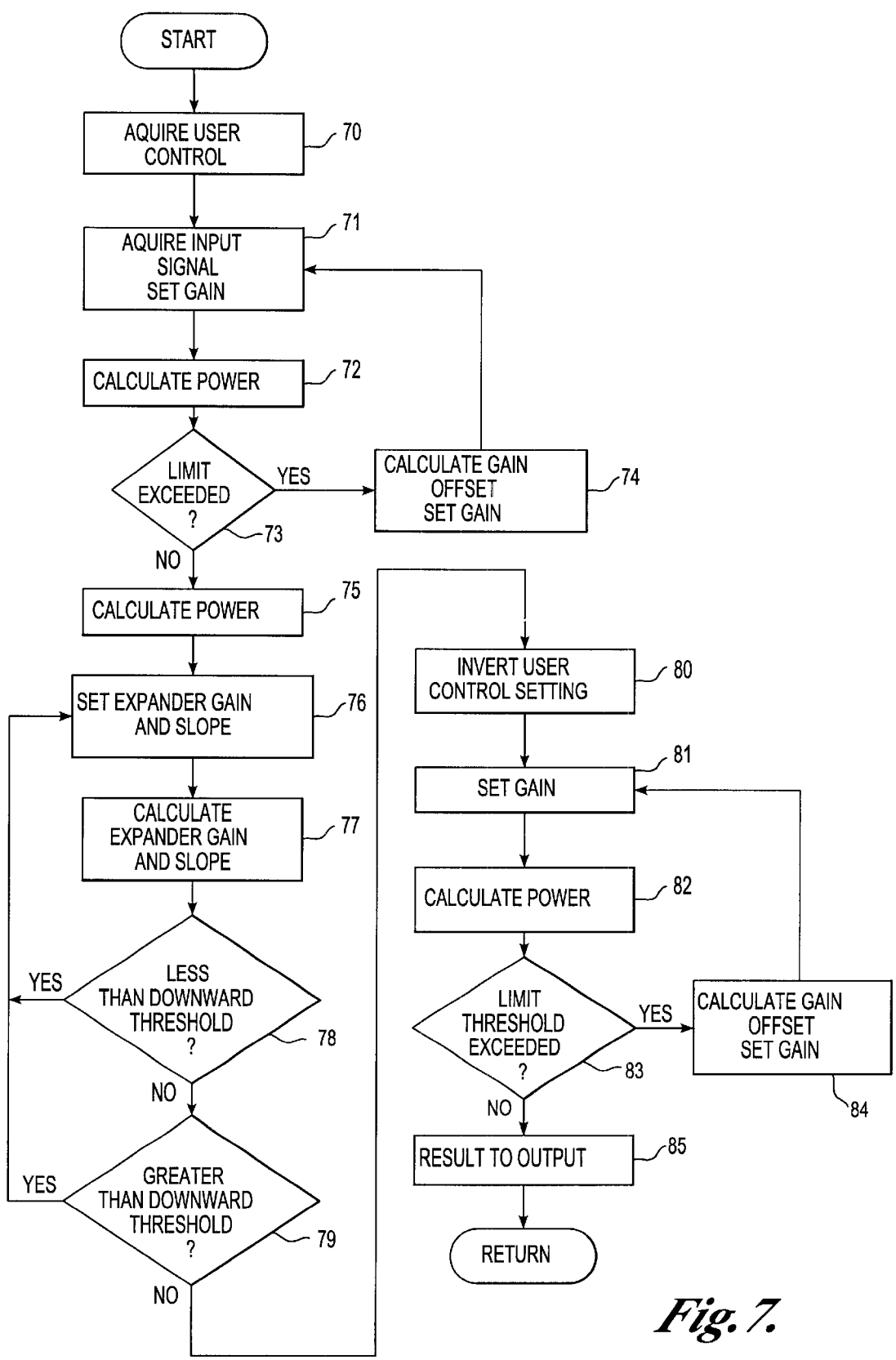
FIG. 7 is a flow diagram illustrating the operation of a dynamic voice operated filtering system of FIG. 6.

FIG. 7 illustrates the operation of the dynamic voice operated filtering system 60 (FIG. 6). The process illustrated by FIG. 7 implements in software the processing provided by system 5 (FIG. 4). In a block 70, the input limiter process begins by acquiring the setting of the user control 13 (FIG. 2) provided by the user. Then in a block 71, the process acquires a sample of the combined voice and noise input signal (FIG. 2). The process sets the gain using the user control setting and scales the input signal sample. Then in a block 72, the process calculates the rms power of the scaled input signal sample.

The process proceeds to a next block 73 in which the rms power of the scaled input signal sample is compared to a limit threshold. This threshold is the maximum magnitude value that the expander 9 can process without error. Although there may be, in effect, no dynamic range problems when the expander is implemented in software, a signal that is too large can cause an overboost condition which can sound too accentuated. If the scaled input signal sample exceeds the threshold, the process proceeds to a block 74 in which the process calculates the gain offset and adjusts the gain. Then in a feedback-like step, the process returns to the block 71 to scale the input signal sample using the adjusted gain. The process then proceeds to the blocks 72 and 73 as described above. However, if in the block 73 the rms power does not exceed the threshold, the process proceeds to a next block 75 to begin the expander process.

In the block 75, the process calculates the rms power. This step is needed in case the gain was adjusted in block 73. In a next block 76, the process sets the expander gain and slope as illustrated in FIG. 5B. Then in a next block 77 the process scales the input signal sample according to the settings of the block 76 to generate an expanded input signal sample. Then in the blocks 78 and 79, the process compares the expanded input signal sample to predetermined minimum and maximum magnitude thresholds. If the expanded input signal sample is beyond one of the thresholds, the process returns to the block 76 in which the gain and slope of the expander are readjusted. However, if the expanded input signal sample is within the thresholds, the process proceeds to a block 80 to begin the output limiter process.

In the block 80, the process acquires the user control setting for the output limiter process by inverting the setting for the input limiter process (described above in conjunction with the block 70). In a next block 81, the process sets the gain of the output limiter process using the inverted user control setting and scales the expanded input signal sample. Then in a block 82, the process calculates the rms power of the scaled expanded input signal sample.

The process proceeds to a next block 83 in which the rms power of the scaled expanded input signal sample is compared to a limit threshold. This threshold is the maximum magnitude value that the downstream acoustic output device (not shown) is designed to handle. If the scaled expanded input signal sample exceeds the threshold, the process proceeds to a block 84 in which the process calculates the gain offset and adjusts the gain. Then in a feedback-like step, the process returns to the block 81 to scale the expanded input signal sample using the adjusted gain. However, returning to the block 83, if the rms power does not exceed the threshold, the process proceeds to a next block 85 in which the scaled expanded signal sample is converted to analog form and provided to the acoustic output device (not shown).

The embodiments of the dynamic voice operated filtering system described above are illustrative of the principles of the present invention and are not intended to limit the invention to the particular embodiments described. For example, in light of the present disclosure, those skilled in the art can devise, without undue experimentation, embodiments using expander chips, voltage-controlled amplifiers or DSP chips that are different from those described. Further, different response curves can be used in other embodiments. Accordingly, while the preferred embodiment of the invention has been illustrated and described, it will be appreciated that various changes can be made therein without departing from the spirit and scope of the invention.

I claim:

1. A dynamic voice operated filtering system for use in an aircraft voice intercom system, the aircraft voice intercom system having an acoustic input device and an acoustic output device, the acoustic input device being configured to provide an acoustic input signal that can have a plurality of combinations of speech and ambient noise components, the acoustic output device being configured to provide an acoustic output signal as a function of a received signal, the system comprising:

a first limiter coupled to receive the acoustic input signal, wherein the first limiter is configured to actively adjust a signal strength of the acoustic input signal to provide a first limited signal;

an expander coupled to the first limiter, wherein the expander is configured to process the first limited signal to provide an expanded signal having an amplitude that is a function of the amplitude of the first limited signal;

a second limiter coupled to the expander, wherein the second limiter is configured to actively adjust a signal strength of the expanded signal to provide an output signal, the output signal being provided to the acoustic output device; and a control circuit coupled to the first and second limiters, wherein the control circuit is configured to change the configuration of the first limiter in adjusting the signal strength of the acoustic input signal in response to an adjustment of the control circuit by a user.

2. The system of claim 1 wherein the control circuit is further configured to change the configuration of the second limiter in adjusting the signal strength of the expanded signal in response to the adjustment of the control circuit by the user.

3. The system of claim 2 wherein in response to the adjustment of the control circuit by the user, the control circuit is configured to cause an opposite change in the signal strength of the expanded signal as the change in the signal strength of the acoustic input signal.

4. The system of claim 1 wherein the first limiter comprises:

a first voltage-controlled amplifier having an input lead, an output lead and a control lead, the input lead of the first voltage-controlled amplifier being coupled to receive the acoustic input signal;

a first rectifying circuit having an input lead coupled to the input lead of the first voltage-controlled amplifier; and a first differential amplifier having a first polarity input lead coupled to an output lead of the first rectifying circuit, having a second polarity input lead coupled to an output lead of the control circuit, and having an output lead coupled to the control lead of the first voltage-controlled amplifier.

5. The system of claim 4 wherein the second limiter further comprises:
   a second voltage-controlled amplifier having an input lead, an output lead and a control lead, the input lead of the second voltage-controlled amplifier being coupled to receive the expanded signal;
   a second rectifying circuit having an input lead coupled to the input lead of the second voltage-controlled amplifier; and
   a second differential amplifier having a first polarity input lead coupled to an output lead of the second rectifying circuit and an output lead of the control circuit, and having an output lead coupled to the control lead of the second voltage-controlled amplifier.

6. The system of claim 1 wherein the control circuit comprises a variable voltage control equipment of the an output level variable voltage control element being coupled to the output lead of the control circuit.

7. The system of claim 6, wherein the variable control element comprises a potentiometer.

8. The system of claim 1 wherein the signal system adjustment provided by the first limiter adjusts an offset of the expander so that the expanded signal has a relatively high signal strength when the acoustic input signal has a speech component.

9. The system of claim 1, wherein the signal system adjustment provided by the first limiter adjusts an offset of the expander so that the expanded signal has a relatively low signal strength when the acoustic input signal has an ambient noise component but said input signal does not have a speech component.

10. The system of claim 9 wherein the user can adjust the control circuit so as to adjust the signal strength of the first limited signal having only a noise component to a threshold level, the threshold level being the signal strength at which the expander provides the expanded signal with a desired relatively low signal strength.

11. A method of dynamically filtering an acoustic input signal in an aircraft voice intercom system, the aircraft voice intercom system having an acoustic input device and an acoustic output device, the acoustic input device being configured to provide the acoustic input signal, the acoustic input signal having a plurality of combinations of speech and ambient noise components, the acoustic output device being configured to provide an acoustic output signal as a function of a received signal, the method comprising:
   dynamically scaling the acoustic input signal from the acoustic input device to provide a dynamically scaled input signal;
   expanding the dynamically scaled input signal to provide an expanded signal; and
   dynamically scaling the expanded signal to provide an output signal to the acoustic output device, wherein the output signal has a relatively low signal strength when the acoustic input signal has a noise component and no speech component.

12. The method of claim 11 further comprising adjusting an offset of the dynamically scaled input signal through the use of a user control.

13. The method of claim 12 further comprising oppositely adjusting an offset of the output signal concurrent with adjusting the offset of the dynamically scaled input signal.

14. The method of claim 11 wherein dynamically scaling the acoustic input signal comprises:
   feeding back the dynamically scaled input signal;
   determining a signal strength of the fed back dynamically scaled input signal;
   comparing the signal strength of the fed back dynamically scaled input signal to a user-controlled threshold level; and
   adjusting the scaling provided to the acoustic input signal in response to the comparison.

15. The method of claim 14 wherein the user-controlled threshold level can be changed to adjust an offset of the dynamically scaled input signal.

* * * * *